United States Patent
Kobayashi et al.

(10) Patent No.: US 10,336,287 B2
(45) Date of Patent: Jul. 2, 2019

(54) GAS GENERATOR

(71) Applicant: DAICEL CORPORATION, Osaka-shi, Osaka (JP)

(72) Inventors: Tomoharu Kobayashi, Tatsuno (JP); Kenji Fukumoto, Tatsuno (JP)

(73) Assignee: DAICEL CORPORATION, Osaka-shi (JP)

( * ) Notice: Subject to any disclaimer, the term of this patent is extended or adjusted under 35 U.S.C. 154(b) by 47 days.

(21) Appl. No.: 15/568,321

(22) PCT Filed: Apr. 5, 2016

(86) PCT No.: PCT/JP2016/061117
§ 371 (c)(1),
(2) Date: Oct. 20, 2017

(87) PCT Pub. No.: WO2016/189971
PCT Pub. Date: Dec. 1, 2016

(65) Prior Publication Data
US 2018/0118153 A1  May 3, 2018

(30) Foreign Application Priority Data
May 22, 2015 (JP) .................. 2015-104170

(51) Int. Cl.
*B60R 21/264* (2006.01)
*B60R 21/272* (2006.01)

(52) U.S. Cl.
CPC .......... *B60R 21/264* (2013.01); *B60R 21/272* (2013.01)

(58) Field of Classification Search
CPC ... B60R 21/264; B60R 21/272; B60R 21/276; B60R 2021/2642; B60R 2021/2685
See application file for complete search history.

(56) References Cited

U.S. PATENT DOCUMENTS

| 5,022,674 A | 6/1991 | Frantom et al. |
| 5,570,904 A | 11/1996 | Cuevas |

(Continued)

FOREIGN PATENT DOCUMENTS

| JP | 5-506195 A | 9/1993 |
| JP | 8-156735 A | 6/1996 |

(Continued)

OTHER PUBLICATIONS

International Preliminary Report on Patentability and the English translation of the Written Opinion of the International Searching Authority (Forms PCT/IB/373 and PCT/ISA/237), dated Nov. 28, 2017, for International Application No. PCT/JP2016/061117.

(Continued)

*Primary Examiner* — James A English
(74) *Attorney, Agent, or Firm* — Birch, Stewart, Kolasch & Birch, LLP (57) ABSTRACT

The present invention provides a gas generator, including; a combustion chamber accommodating an igniter and a gas generating agent; a pressurized gas chamber filled with a gas selected from a rare gas or a nitrogen gas; a diffuser chamber located between the combustion chamber and the pressurized gas chamber and provided with a gas discharge port;
a first closing member closing between the combustion chamber and the diffuser chamber, a second closing member closing between the pressurized gas chamber and the diffuser chamber;
the combustion chamber having at least one of a space in which the first closing member deforms or moves, and a member which forms the space for enabling the first closing member to deform or move,
when the gas generator is placed in a high-temperature atmosphere, due to a pressure increase or an impact caused by the gas inflow into the diffuser chamber, the (Continued)

first closing member being deformed or the first closing member being moved toward the combustion chamber, thereby making the combustion chamber and the diffuser chamber communicate with each other and making an inside of the combustion chamber and an outside of the gas generator communicate with each other.

10 Claims, 4 Drawing Sheets

(56) References Cited

U.S. PATENT DOCUMENTS

| | | | |
|---|---|---|---|
| 6,447,008 | B1 | 9/2002 | Karlin et al. |
| 6,620,269 | B1 | 9/2003 | Canterberry et al. |
| 2004/0195812 | A1* | 10/2004 | Canterberry .......... B60R 21/268 280/737 |
| 2010/0186617 | A1* | 7/2010 | Zhang ................... B60R 21/264 102/530 |
| 2010/0194085 | A1* | 8/2010 | Mayville ............. B60R 21/2644 280/741 |
| 2014/0123868 | A1 | 5/2014 | Kobayashi |
| 2014/0208975 | A1 | 7/2014 | Kobayashi et al. |

FOREIGN PATENT DOCUMENTS

| | | |
|---|---|---|
| JP | 2002-172998 A | 6/2002 |
| JP | 2001-55112 A | 2/2011 |
| JP | 2014-94614 A | 5/2014 |
| JP | 2014-144736 A | 8/2014 |
| WO | WO 91/15380 A1 | 10/1991 |
| WO | 8-85410 A | 4/1996 |

OTHER PUBLICATIONS

International Search Report for PCT/JP2016/061117 (PCT/ISA/210) dated Jul. 12, 2016.
Written Opinion of the International Searching Authority for PCT/JP2016/061117 (PCT/ISA/237) dated Jul. 12, 2016.

* cited by examiner

GAS GENERATOR

TECHNICAL FIELD

The present invention relates to a gas generator which is usable for an airbag apparatus or the like.

DESCRIPTION OF RELATED ART

Some of gas generators used in airbag apparatuses for automobiles have, in a cylindrical housing, a combustion chamber filled with a gas generating agent and a pressurized gas chamber filled with a gas at a high pressure, and also have a diffuser chamber, which is provided with a gas discharge port, between the combustion chamber and the pressurized gas chamber.

Closing members close between the combustion chamber and the diffuser chamber, and between the pressurized gas chamber and the diffuser chamber respectively, and the gas discharge port of the diffuser chamber is opened.

When an airbag apparatus including such a gas generator is placed in a high temperature state caused by fire or the like, a gas is expanded in the pressurized gas chamber to a high-pressure state and the closing member is fractured and opened, so that the pressurized gas passes through the diffuser chamber and is discharged from the gas discharge port.

Where the high temperature state is thereafter maintained as it is, the gas generating agent in the combustion chamber which is a closed space is eventually ignited and burned to generate a combustion gas. However, where a strength of the cylindrical housing is deteriorated under the effect of heat, the pressure in the sealed combustion chamber rises due to the generation of the combustion gas and the cylindrical housing itself may be fractured.

U.S. Pat. No. 6,447,008 discloses a gas generator in which a discharge chamber 7 is formed between a pressure chamber 9 and a charge chamber 2, and these chambers are separated by a sealing disk 25 and a separating wall 6, respectively.

When an external temperature rises to a high temperature, and a pressure in the charge chamber 2 is raised by the combustion of the charge 3, a sealing stopper 23 detaches and flies into the pressure chamber 9, a peripheral edge portion of a separating wall 6 (a portion in contact with a chamber wall section 10) breaks, and the separating wall 6 moves to the discharge chamber 7, thereby making the charge chamber 2 communicate with the outside of the housing through a discharge opening 26.

SUMMARY OF INVENTION

The present invention provides a gas generator, including;
a combustion chamber, which is located on the side of a first end portion of a cylindrical housing and accommodates an igniter and a gas generating agent; a pressurized gas chamber, which is located on the side of a second end portion opposite to the first end portion and filled with a gas selected from a rare gas or a nitrogen gas; a diffuser chamber, which is located between the combustion chamber and the pressurized gas chamber and provided with a gas discharge port;
a first closing member abutting against the inner circumferential wall surface of the cylindrical housing and closing between the combustion chamber and the diffuser chamber;
a second closing member being fixed to the inner circumferential wall surface of the cylindrical housing and closing between the pressurized gas chamber and the diffuser chamber,
the combustion chamber having at least one of a space in which the first closing member deforms or moves, and a member which forms the space for enabling the first closing member to deform or move,
when the gas generator is placed in a high-temperature atmosphere caused by fire due to expansion of the gas in the pressurized gas chamber, the second closing member being ruptured from the pressurized gas chamber toward the diffuser chamber to allow the gas to flow into the diffuser chamber, and
then, due to a pressure increase or an impact caused by the gas inflow into the diffuser chamber, the first closing member being deformed or the first closing member being moved toward the combustion chamber, thereby making the combustion chamber and the diffuser chamber communicate with each other and making an inside of the combustion chamber and an outside of the gas generator communicate with each other.

BRIEF DESCRIPTION OF DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

In the gas generator disclosed in U.S. Pat. No. 6,447,008, it is presumed that the charge chamber 2 operates first. When the external temperature rises, the pressurized gas chamber is also heated, so that the pressure in the pressure chamber 9 also rises. In this state, it is conceivable that a corresponding pressure is also applied to the sealing disk 25 and that the sealing stopper 23 is unlikely to fly, so it is not certain whether an expected operation can be performed.

Further, when the pressure chamber 9 is pressurized in advance, a load is applied in the opposite direction (from the pressure chamber 9 to the discharge chamber 7), so that the sealing disk 25 is not ruptured easily.

The present invention provides a gas generator which is enhanced in safety even when placed in a high-temperature atmosphere caused by fire.

The gas generator of the present invention includes a combustion chamber located on the side of a first end of a cylindrical housing, a pressurized gas chamber located on the side of a second end opposite to the first end, and a diffuser chamber provided with a gas discharge port and located between the combustion chamber and the pressurized gas chamber.

At the time of operation, the gas generator operates in the following manner.

When an igniter is actuated and a gas generating agent in the combustion chamber is ignited and burned, a combustion gas is generated. A first closing member is ruptured and opened by a pressure from the combustion gas, and then the combustion gas flows into the diffuser chamber.

When a second closing member is ruptured and opened by increase of a pressure caused by the combustion gas flowing into the diffuser chamber, or by a breaking device that received the pressure of the combustion gas, the gas in the pressurized gas chamber flows into the diffuser chamber.

Thereafter, the combustion gas and the pressurized gas flowing into the diffuser chamber are discharged from the gas discharge port.

Figure 1:
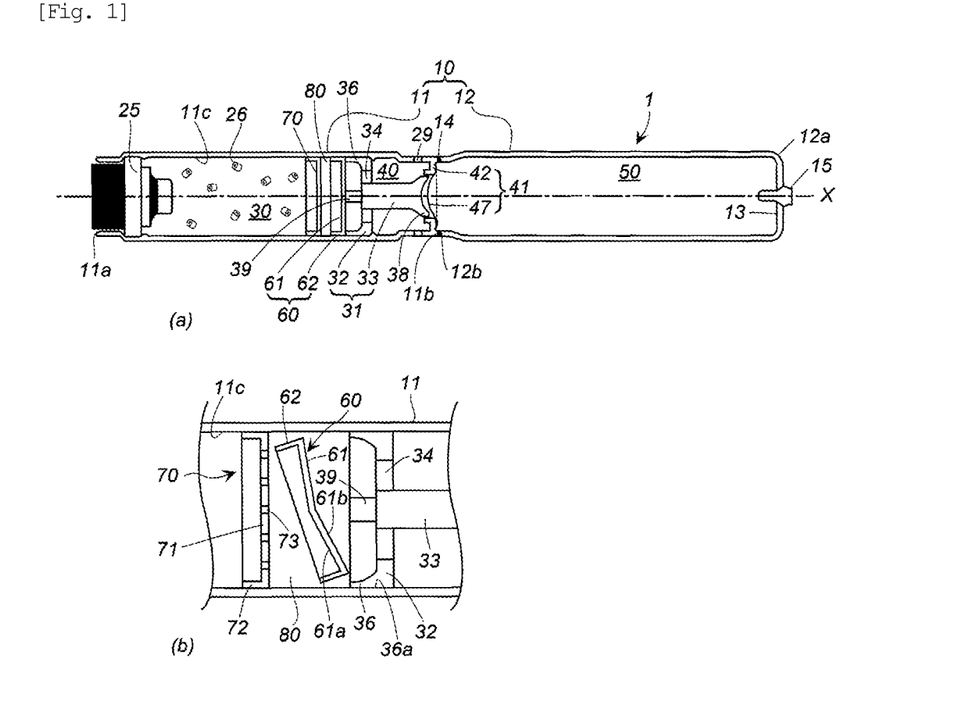
FIG. 1 shows, in (a), a cross-sectional view in a longitudinal direction of a gas generator which is an embodiment of the present invention, and in (b), a state after actuation of (a)

As the breaking device, for example, the multifunctional member shown in FIG. 1 of JP-A No. 2014-094614, and the multifunctional member shown in FIG. 1 of JP-A No. 2014-144736 are known.

The gas generator of the present invention operates to secure safely as much as possible even in an abnormal situation such as when the gas generator is placed in a high-temperature state due to a fire or the like, different from the above-described case of normal operation.

The gas generator of the present invention has one or both of the following means (I) and (II) for an operation of enhancing safety when the aforementioned abnormal situation occurs:

(I) A space formed in the combustion chamber for the first closing member to deform or move therein; and (II) A member for forming a space which enables the first closing member disposed in the combustion chamber to deform or move.

With the means (I), there is a space in the combustion chamber before the actuation.

With the means (II), there is no space in the combustion chamber before the actuation, but a space is formed when a pressure is applied from the diffuser chamber to the first closing member.

When the gas generator of the present invention is placed in a high-temperature state caused by fire or the like, a pressure in the pressurized gas chamber rises and the second closing member is ruptured and opened.

When the gas flows from an opening into the diffuser chamber and a pressure in the diffuser chamber rises, the first closing member is pushed toward the igniter. At that time, if the gas generating agent is densely filled in the entire inside of the combustion chamber, the gas generating agent acts to support the first closing member, so that deformation and movement of the first closing member are unlikely to occur.

However, in the present invention, since either one or both of the above-mentioned means (I) and (II) are available, the first closing member deforms or moves, thereby making the combustion chamber and the diffuser chamber communicate with each other.

Therefore, even when the gas generating agent in the combustion chamber is ignited and burned to generate a combustion gas due to further temperature rise in the surrounding environment, the combustion chamber is communicated with the diffuser chamber because of deformation or movement of the first closing member. As a result, the combustion gas passes through the diffuser chamber and is discharged from the gas discharge port. Therefore, excessive pressure is not applied to the housing of the gas generator, and the housing is prevented from fracturing.

In the present invention, since both the first closing member and the second closing member serve for partitioning and closing the inside of the cylindrical housing, the two members are plate shaped.

The first closing member and the second closing member are arranged so that diametrical directions thereof are orthogonal to the longitudinal axis direction of the cylindrical housing.

In the present invention, the deformation of the first closing member means that the first closing member is cracked, distorted, or bent, thereby creating a gap that allows the combustion gas to pass between the combustion chamber and the diffuser chamber.

Further, in the present invention, the movement of the first closing member means that the first closing member moves such that the diametric direction of the first closing member is oblique relative to the longitudinal axis direction of the cylindrical housing and thereby, a gap, which allows the combustion gas to pass between the combustion chamber and the diffuser chamber, is generated.

Further, the present invention is also inclusive of a case in which the first closing member is deformed and moved to generate a gap that allows the combustion gas to pass between the combustion chamber and the diffuser chamber.

It is possible in one embodiment of the gas generator of the present invention, that the space is formed in the combustion chamber to enable the first closing member to deform or move, and the space is formed between the gas generating agent and the first closing member by a retainer which is in contact with the gas generating agent, arranged at a distance from the first closing member and provided with a communication hole.

Described above is the preferred embodiment of the means (I).

The retainer is disposed at a position close to the first closing member in the combustion chamber, and thereby a space in which the first closing member deforms or moves is formed between the retainer and the first closing member.

Therefore, when the first closing member is pushed from the diffuser chamber toward the igniter, the presence of the space facilitates deformation or movement of the first closing member.

It is possible in one embodiment of the gas generator of the present invention, that the space is formed in the combustion chamber to enable the first closing member to deform or move, the space is formed between the gas generating agent and the igniter by a retainer which is in contact with the gas generating agent, arranged at a distance from the igniter and provided with a communication hole, and the retainer is moved toward the igniter at the time of actuation.

Alternatively, the retainer may be moved toward the igniter when the first closing member is deformed by the pressure increase or the impact caused by gas inflow into the diffuser chamber.

Described above is the preferred embodiment of the means (I).

The retainer is disposed at a position close to the igniter in the combustion chamber, and thereby a space which enables the first closing member to deform or move is formed between the retainer and the igniter.

Therefore, when the first closing member is pushed from the diffuser chamber toward the igniter, the presence of the space facilitates deformation or movement of the first closing member.

It is possible in one embodiment of the gas generator of the present invention, that the space is formed in the combustion chamber to enable the first closing member to deform or move, the space is formed between a first retainer and a second retainer, the first retainer is disposed on the side of the first closing member and provided with a communication hole, and the second retainer is disposed on the side of the igniter, axially spaced from the first retainer and provided with a communication hole, a surface of the first retainer on the side of the first closing member and a surface of the second retainer on the side of the igniter are in contact with a gas generating agent, and the first retainer moves toward the second retainer at the time of actuation.

Alternatively, the first retainer may be moved toward the second retainer when the first closing member is deformed by the pressure increase or the impact caused by gas inflow into the diffuser chamber.

Described above is the preferred embodiment of the means (I).

In this embodiment, for example, two retainers are arranged at an interval at intermediate positions between the first closing member and the igniter in the combustion chamber, thereby forming a space which enables the first closing member to deform or move between the two retainers.

Therefore, when the first closing member is pushed from the diffuser chamber toward the igniter, the presence of the space facilitates deformation or movement of the first closing member.

It is possible in one embodiment of the gas generator of the present invention, that the member is arranged to form the space in the combustion chamber which enables the first closing member to deform or move, the member is a deformable member disposed in contact with both the first closing member and the gas generating agent, and at the time of actuation, the space which enables the first closing member to deform or move is formed by deformation of the deformable member.

Alternatively, the space which enables the first closing member to deform or move can be formed by deformation of the first closing member and deformation of the deformable member caused by the pressure increase or the impact caused by gas inflow into the diffuser chamber.

Described above is the preferred embodiment of the means (II).

The deformable member is, for example, a disk-shaped sponge, a disk-shaped member made of a metal mesh or a synthetic resin mesh, or the like and is easily deformed when subjected to pressure. At the time of normal actuation, the deformable member does not interfere with the passage of the combustion gas.

When using a disk-shaped member made of a metal mesh or a synthetic resin mesh as the deformable member, a size of the mesh is such that the gas generating agent does not penetrate therethrough.

Therefore, when the first closing member is pushed from the diffuser chamber toward the igniter, the deformable member deforms so as to reduce its volume, thereby facilitating deformation or movement of the first closing member.

In the above-described embodiment, since the deformable member is disposed between the first closing member and the gas generating agent, the deformable member also functions as a buffer member between the gas generating agent and the first closing member.

It is possible in one embodiment of the gas generator of the present invention, that the member for forming the space in the combustion chamber which enables the first closing member to deform or move is a deformable member disposed between the gas generating agent and the igniter, the deformable member is disposed in contact with the gas generating agent and the igniter in a portion excluding the ignition portion, and at the time of actuation, the space which enables the first closing member to deform or move is formed by deformation of the deformable member.

Alternatively, the space which enables the first closing member to deform or move can be formed by deformation of the first closing member and deformation of the deformable member caused by the pressure increase or the impact caused by gas inflow into the diffuser chamber.

Described above is the preferred embodiment of the means (II).

The deformable member is, for example, an annular sponge, an annular member made of a metal mesh or a synthetic resin mesh, or the like and is easily deformed when subjected to pressure.

Therefore, when the first closing member is pushed from the diffuser chamber toward the igniter and the gas generating agent in the combustion chamber is also pushed toward the igniter on receiving the pushed first closing member, the deformable member deforms so as to reduce its volume, thereby facilitating deformation or movement of the first closing member.

In the above-described embodiment, since the deformable member is disposed between the igniter and the gas generating agent, the deformable member also functions as a buffer member between the gas generating agent and the igniter.

It is possible in one embodiment of the gas generator of the present invention, that the member is arranged to form the space in the combustion chamber which enables the first closing member to deform or move, the member is a deformable member disposed to be surrounded by the gas generating agent, and at the time of actuation, the space which enables the first closing member to deform or move is formed by deformation of the deformable member.

Alternatively, the deformable member can be disposed such that at least both end surfaces thereof are surrounded by the gas generating agent.

Further, the space which enables the first closing member to deform or move can be formed by deformation of the first closing member and deformation of the deformable member caused by the pressure increase or the impact caused by gas inflow into the diffuser chamber.

Described above is the preferred embodiment of the means (II).

The deformable member is, for example, a disk-shaped sponge, a disk-shaped member made of a metal mesh or a synthetic resin mesh, or the like and is easily deformed when subjected to pressure. At the time of normal actuation, the deformable member does not interfere with the passage of the combustion gas.

Therefore, when the first closing member is pushed from the diffuser chamber toward the igniter and the gas generating agent in the combustion chamber is also pushed toward the igniter on receiving the pushed first closing member, the deformable member deforms so as to reduce its volume, thereby facilitating deformation or movement of the first closing member.

It is possible in one embodiment of the gas generator of the present invention, that, both the space in which the first closing member deforms or moves, and the member which forms the space for enabling the first closing member to deform or move, are arranged in the combustion chamber, the space is formed between the gas generating agent and the first closing member by a retainer which is in contact with the gas generating agent, arranged at a distance from the first closing member and provided with a communication hole, and the member is a deformable member disposed in the space.

Described above is the preferred embodiment provided with both the means (I) and the means (II).

Therefore, when the first closing member is pushed from the diffuser chamber toward the igniter, both the presence of the space and the deformation of the deformable member such as to reduce its volume facilitate deformation or movement of the first closing member.

It is possible in one embodiment of the gas generator of the present invention, that the first closing member has a circular bottom portion and an annular wall surface extending in one direction from an outer periphery of the circular bottom portion, an outer bottom surface of the circular bottom portion is positioned on the side of the diffuser chamber and an inner bottom surface on the side of the annular wall surface is positioned on the side of the combustion chamber, and an outer surface of the annular wall surface and the inner circumferential wall surface of the cylindrical housing are abutted against each other with a sealant being interposed therebetween.

Preferably, the first closing member, which includes a circular bottom portion and an annular wall surface, is used and a sealant is interposed between the outer surface of the annular wall surface and the inner circumferential wall surface of the cylindrical housing since air tightness of the combustion chamber before the actuation is enhanced.

It is possible in one embodiment of the gas generator of the present invention, that the first closing member has a fragile portion for assisting the deformation or movement thereof.

For example, the fragile portion can include a groove having a V-shaped cross-sectional shape in the thickness direction, and it can be formed radially from the center of the surface of the first closing member.

When the gas generator of the present invention is placed in a high temperature state due to a fire or the like and the second closing member closing the pressurized gas chamber is ruptured first, the combustion chamber and the diffuser chamber are communicated with each other by deforming or moving the first closing member that closes the combustion chamber.

Therefore, when the gas generating agent in the combustion chamber is ignited and burned to generate a combustion gas due to subsequent increase in temperature, the generated combustion gas is immediately discharged through the diffuser chamber and from the gas discharge ports, without being accumulated in the sealed combustion chamber. As a result, even when a strength of the gas generator itself is deteriorated by heat, the gas generator is not fractured by pressure at the time of actuation.

The gas generator of the present invention can be used in an airbag apparatus mounted on an automobile or the like.

EMBODIMENTS OF INVENTION (1) Gas Generator Shown in FIG. 1

In a gas generator 1 shown in (a) in FIG. 1, a combustion chamber 30, a diffuser chamber 40, and a pressurized gas chamber 50 are arranged in a cylindrical housing 10.

The cylindrical housing 10 includes a combustion chamber housing 11 and a pressurized gas chamber housing 12, but the entire cylindrical housing may be formed of a single housing.

In the combustion chamber housing 11, an electric igniter 25 is fixed to an opening of a first end portion 11*a*.

A second end portion 12*a* of the pressurized gas chamber housing 12 is closed (a closing surface 13).

An opening of a second end portion 11*b* of the combustion chamber housing 11 and an opening of a first end portion 12*b* of the pressurized gas chamber housing 12 are welded and integrated at a joining portion 14.

The cylindrical housing 10 (the combustion chamber housing 11 and the pressurized gas chamber housing 12) is made of iron, stainless steel or the like.

A rare gas such as argon or helium, a nitrogen gas or the like is filled in the pressurized gas chamber 50 under a high pressure.

The gas is filled from a gas filling hole in the closing surface 13 of the pressurized gas chamber housing 12.

A pin 15 is inserted into the gas filling hole after the gas is filled, and then the pin 15 and the closing surface 13 are welded together to close the gas filling hole.

A second closing member 41 closes between the pressurized gas chamber 50 and the diffuser chamber 40.

The second closing member 41 includes a fixing portion 42 and a rupturable plate 47 welded and fixed to the fixing portion 42.

The rupturable plate 47 is made of iron, stainless steel or the like. A periphery of the rupturable plate 47 is abutted against the fixing portion 42, and in this state, the rupturable plate 47 is welded and fixed thereto.

The diffuser chamber 40 is a space into which a gas flows from the pressurized gas chamber 50 and a combustion gas flows from the combustion chamber 30 at the time of actuation.

A plurality of gas discharge ports 29 are formed in the combustion chamber housing 11 facing the diffuser chamber 40.

The plurality of the gas discharge ports 29 are formed at equal intervals in the circumferential direction of the combustion chamber housing 11.

A known filter can be disposed at a position such as to cover the gas discharge ports 29 of the diffuser portion 40 from the inside.

A breaking device 31 which includes a base portion 32 and a rod 33 extending from the base portion 32 toward the rupturable plate 47 is disposed between the diffuser chamber 40 and the combustion chamber 30.

In the breaking device 31, the base portion 32 and the rod 33 are integrated.

The base portion 32 is in a disk shape provided with a plurality of through holes 34 in the thickness direction and a cylindrical wall surface 36 extending from the outer periphery of the base portion toward the igniter 25.

An outer circumferential surface 36a of the cylindrical wall surface 36 is abutted against an inner circumferential wall surface 11c of the combustion chamber housing 11 so that the base portion 32 slides in the axis X direction. Since a length of the cylindrical wall surface 36 in the axial direction (the axis X direction) is greater than a thickness of the base portion 32, the rod 33 does not tilt with respect to the axis X, and the base portion 32 slides parallel to the axis X direction.

The rod 33 has an enlarged diameter portion 38 which is enlarged radially outward at a distal end thereof.

A diameter of the enlarged diameter portion 38 is smaller than the inner diameter of the fixing portion 42, and an annular gap is obtained between the enlarged diameter portion 38 and the fixing portion 42. Alternatively, a recess may be formed in part of the outer circumferential surface of the enlarged diameter portion 38 to form a gap between the enlarged diameter portion and the inner circumferential surface of the fixing portion 42.

The rod 33 has the protruding portion 39 extending to the side opposite to the rod 33 on the base portion 32, but the rod may have no protruding portion 39.

The breaking device 31 and the second closing member 41 are arranged such that the enlarged diameter portion 38 which is the distal end portion of the rod 33 is surrounded by the fixing portion 42 before actuation.

A first closing member 60 is positioned to abut against the cylindrical wall surface 36 of the base portion 32.

The first closing member 60 includes a circular main body (a circular bottom surface) 61 and an annular wall surface 62 extending from a periphery of the circular main body 61. A sealant is applied between the annular wall surface 62 and the inner circumferential wall surface 11c of the cylindrical housing 10.

The circular main body 61 has a first surface 61a on the side of the combustion chamber 30 and a second surface 61b on the side of the diffuser chamber 40.

A fragile portion may be formed on the second surface 61b if necessary.

In the combustion chamber 30, the igniter 25 is fixed to the first end portion 11a, and the opposite side in the axis X direction is partitioned by the base portion 32. The igniter 25 shown in (a) in FIG. 1 consists only of an igniter, but a combination of an igniter and a cup member which is filled with a transfer charge or a gas generating agent therein can also be used.

A prescribed amount of gas generating agent 26 is filled in the combustion chamber 30.

The inner circumferential wall surface 11c of the cylindrical housing from the combustion chamber 30 to the diffuser chamber 40 has a protrusion for restricting a movement and a reduced diameter portion for stopping a movement.

A retainer 70 is disposed at a distance (a space 80) from the first closing member 60 in the combustion chamber 30.

The retainer 70 has a main body portion 71 provided with a plurality of communication holes 73 and an annular portion 72 extending from a circumferential edge of the main body portion 71.

The retainer 70 is fitted so that the inner circumferential wall surface 11c and the annular portion 72 are abutted with each other.

A case where the gas generator 1 of the present invention is used in an airbag apparatus and operated normally will be described hereinbelow with reference to (a) in FIG. 1.

When the igniter 25 is actuated, the gas generating agent 26 in the combustion chamber 30 is ignited and burned to generate a combustion gas.

The combustion gas flows into the space 80 through the communication holes 73 of the retainer 70, and then applies a pressure to the first closing member 60. At this time, even when the retainer 70 moves in the axial direction on receiving the pressure of the combustion gas, the operation is not affected and proceeds normally.

The first closing member 60 which receives the pressure by the combustion gas pushes the base portion 32 (the cylindrical wall surface 36) of the breaking device 31 in the axis X direction, and the circular main body portion 61 is ruptured and opened.

After passing through an opening of the first closing member 60, the combustion gas flows into the diffuser chamber 40 through the through holes 34 of the base portion 32 and then is discharged from the gas discharge ports 29.

Concurrently, the base portion 32 of the breaking device 31 moves in the axis X direction, whereby the enlarged diameter portion 38 breaks and opens the rupturable plate 47.

After flowing into the diffuser chamber 40 from the opening, the gas in the pressurized gas chamber 50 is discharged from the gas discharge ports 29.

Next, the operation performed when the gas generator 1 of the present invention is placed in a high-temperature atmosphere caused by fire, rather than a normal actuation state, will be described with reference to (a) and (b) in FIG. 1.

When the gas generator 1 is placed in a high-temperature atmosphere caused by fire, the gas in the pressurized gas chamber 50 expands, so that the rupturable plate 47 is ruptured and opened by receiving a pressure of the gas.

The gas in the pressurized gas chamber 50 passes through the gap between the enlarged diameter portion 38 of the rod 33 and the fixing portion 42 and flows into the diffuser chamber 40 from the opening of the rupturable plate 47.

The pressure rise and the impact caused by the gas inflow in the diffuser chamber 40 is transmitted to the first closing member 60 via the through holes 34. As a result, when the first closing member 60 deforms or moves toward the combustion chamber 30, the combustion chamber 30 and the diffuser chamber 40 communicate with each other. At this time, since the space 80 is present between the first closing member 60 and the retainer 70, the first closing member 60 deforms and then moves, for example, as shown in (b) in FIG. 1, thereby forming a gap between the inner circumferential wall surface 11c and the first closing member 60.

As the gap is formed, the combustion chamber 30 and the diffuser chamber 40 communicate with each other.

When temperature of the surrounding environment thereafter further rises and the gas generating agent 26 in the combustion chamber 30 is ignited and burned, a combustion gas passes through the communication holes of the retainer 70, the gap between the first closing member 60 and the inner circumferential wall surface 11c, the through holes 34 of the breaking device 31 and the diffuser chamber 40, and is discharged from the gas discharge ports 29.

When the combustion gas is thus ignited, an inside of the combustion chamber 30 is communicated with the outside of the gas generator. The combustion gas is discharged to the outside of the gas generator 1 immediately after generated, and no excessive pressure is applied to parts of the gas generator 1 including the housing 10. As a result, even when a strength of the parts of the gas generator 1 including the housing 10 is deteriorated by heat, the parts are not fractured and the debris thereof are not scattered.

A preferred embodiment of the gas generator 1 shown in FIG. 1 is described hereinbelow.

(1) a gas generator including the combustion chamber 30, which is located on the side of the first end portion of the cylindrical housing 10 and accommodates the igniter 25 and the gas generating agent 26, the pressurized gas chamber 50, which is located on the side of the second end portion opposite to the first end portion and filled with a gas selected from a rare gas or a nitrogen gas, and the diffuser chamber 40, which is located between the combustion chamber 30 and the pressurized gas chamber 50 is provided with the gas discharge ports 29, the first closing member 60 abutting against the inner circumferential wall surface of the cylindrical housing 10 and closing between the combustion chamber 30 and the diffuser chamber 40, the second closing member 41 being fixed to the inner circumferential wall surface of the cylindrical housing 10 and closing between the pressurized gas chamber 50 and the diffuser chamber 40, the breaking device 31 for the second closing member 41 (the rupturable plate 47) including the base portion 32, whose outer circumferential surface is abutted against the inner circumferential wall surface of the cylindrical housing 10, and a rod 33, which extends from the base portion 32 toward the second closing member 41, and the breaking device 31 being disposed between the combustion chamber 30 and the diffuser chamber 40, the base portion 32 having a plurality of the through holes 34 in the thickness direction and the cylindrical wall surface 36 extending from an outer periphery thereof toward the igniter 25, the first closing member 60 being positioned to abut against the cylindrical wall surface 36 of the base portion 32, the combustion chamber 30 having at least one of the space 80, in which the first closing member 60 deforms or moves, and a member, which forms the space for enabling the first closing member 60 to deform or move, when the gas generator 1 is placed in a high-temperature atmosphere caused by fire, due to expansion of the gas in the pressurized gas chamber 50, the second closing member 41 being ruptured from the pressurized gas chamber 50 toward the diffuser chamber 40 to allow the gas to flow into the diffuser chamber 40, and then, due to the gas inflow into the diffuser chamber 40, the first closing member 60 being deformed or the first closing member 60 being moved toward the combustion chamber 30, thereby making the combustion chamber 30 and the diffuser chamber 40 communicate with each other and making an inside of the combustion chamber 30 and an outside of the gas generator 1 communicate with each other.

Figure 2:
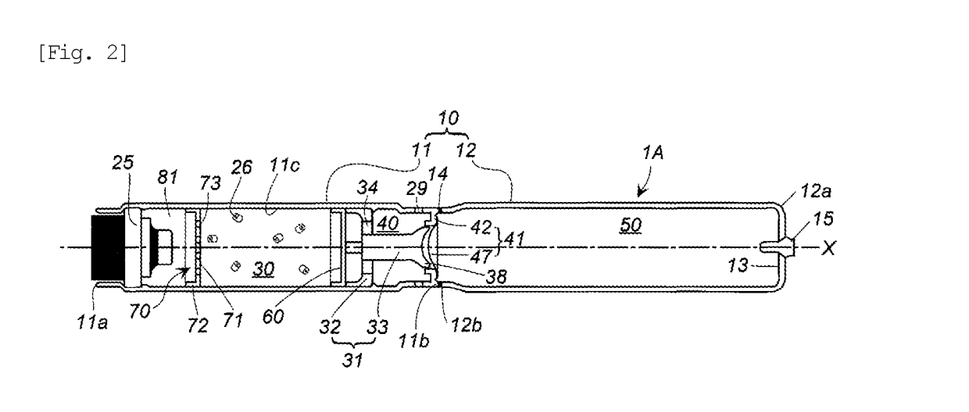
FIG. 2 shows a cross-sectional view in a longitudinal direction of a gas generator which is another embodiment of the present invention.

(2) Gas Generator Shown in FIG. 2

The gas generator 1A shown in FIG. 2 differs from the gas generator 1 shown in FIG. 1 only in a position of the retainer 70 in the axis X direction, other features being the same.

The retainer 70 is disposed in the combustion chamber 30 and fitted in a position closer to the igniter 25.

The position of the retainer 70 is, for example, a position closer to the igniter 25 than an intermediate position on the axial length of the combustion chamber 30, and can be adjusted according to a filling amount of the gas generating agent 26.

A space 81 is formed between the retainer 70 and the igniter 25.

An operation performed when the gas generator 1A shown in FIG. 2 is placed in a high-temperature atmosphere caused by fire will be described hereinbelow.

When the gas generator 1A is placed in a high-temperature atmosphere caused by fire, the first closing member 60 receives a pressure and an impact similarly to the gas generator 1 shown in FIG. 1, and pushes the gas generating agent 26 filled in the combustion chamber 30 toward the igniter 25.

Since a space 81 is present between the retainer 70 and the igniter 25, when the gas generating agent 26 is pushed toward the igniter 25, the retainer 70 moves so as to reduce the space 81. As a result, the first closing member 60 deforms and moves as shown, for example, in (b) in FIG. 1, thereby forming a gap between the inner circumferential wall surface 11c and the first closing member 60.

As the gap is formed, the combustion chamber 30 and the diffuser chamber 40 are communicated with each other.

Thereafter, since the gas generator operates in the same way as the gas generator 1 shown in FIG. 1, the combustion gas is discharged to the outside of the gas generator 1A, and no excessive pressure is applied to parts of the gas generator 1A including the housing 10. As a result, even when a strength of the parts of the gas generator 1A including the housing 10 is deteriorated by heat, these parts are not fractured and the debris thereof are not scattered.

Figure 3:
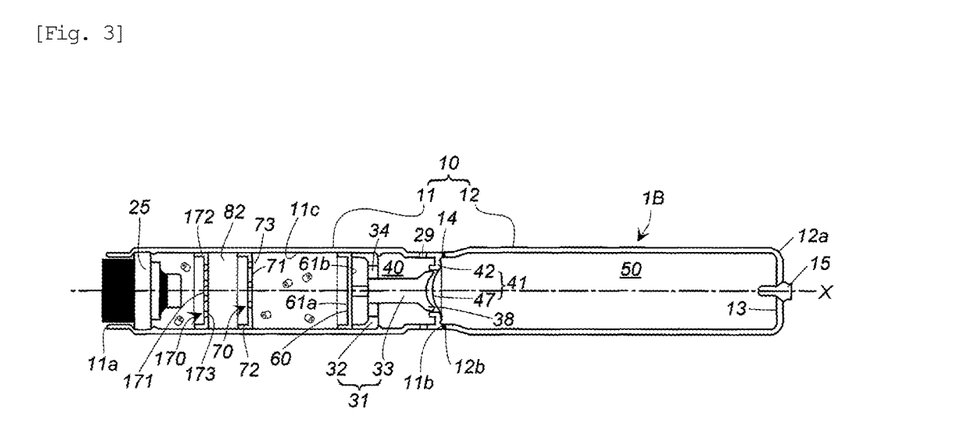
FIG. 3 shows a cross-sectional view in a longitudinal direction of a gas generator which is yet another embodiment of the present invention.

(3) Gas Generator Shown in FIG. 3

A gas generator 1B shown in FIG. 3 differs from the gas generator 1 shown in FIG. 1 in using two retainers and in positions of the retainers in the axis X direction, other features being the same.

A first retainer 70 is the same as the retainer 70 shown in FIG. 1.

A second retainer 170 is the same as the retainer 70 shown in FIG. 1, and has a main body portion 171 provided with a plurality of communication holes 173 and an annular portion 172 extending from the circumferential edge of the main body portion 171.

The first retainer 70 and the second retainer 170 are arranged such that the first retainer 70 is disposed on the side of the first closing member 60 in the combustion chamber 30 and the second retainer 170 is disposed on the side of the igniter 25 in the combustion chamber 30 at a distance from the first retainer 70, so that a space 82 is formed between the retainers.

The first retainer 70 and the second retainer 170 may be disposed at any positions in the axis X direction in the combustion chamber 30 as long as the space 82 is formed.

An operation performed when the gas generator 1B shown in FIG. 3 is placed in a high-temperature atmosphere caused by fire will be described hereinbelow.

When the gas generator 1B is placed in a high-temperature atmosphere caused by fire, the first closing member 60 receives a pressure and an impact similarly to the gas generator 1 shown in FIG. 1, and pushes the gas generating agent 26 filled in the combustion chamber 30 toward the igniter 25.

Since the space 82 is present between the first retainer 70 and the second retainer 170, when the gas generating agent 26 is pushed toward the igniter 25, the first retainer 70 moves so as to reduce the space 82. As a result, the first closing member 60 deforms and moves as shown, for example, in (b) in FIG. 1, thereby forming a gap between the inner circumferential wall surface 11c and the first closing member 60.

As the gap is formed, the combustion chamber 30 and the diffuser chamber 40 are communicated with each other.

Thereafter, since the gas generator operates in the same way as the gas generator 1 shown in FIG. 1, the combustion gas is discharged to the outside of the gas generator 1B, and no excessive pressure is applied to parts of the gas generator 1B including the housing 10. As a result, even when a strength of the parts of the gas generator 1B including the housing 10 is deteriorated by heat, these parts are not fractured and the debris thereof are not scattered.

Figure 4:
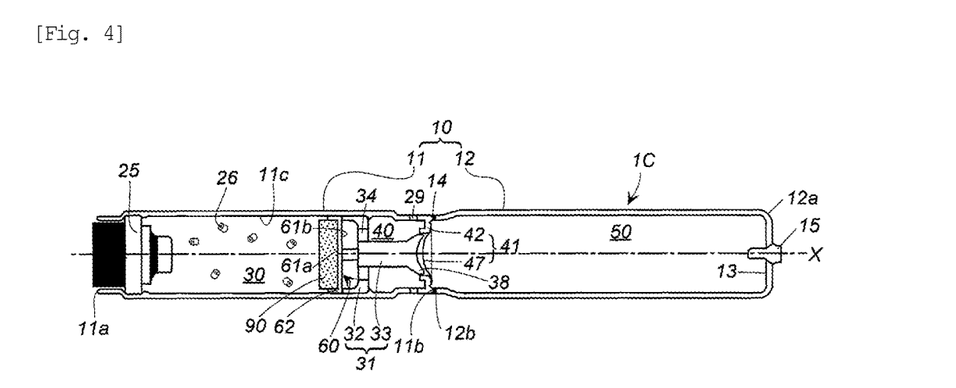
FIG. 4 shows a cross-sectional view in a longitudinal direction of a gas generator which is yet another embodiment of the present invention.

(4) Gas Generator Shown in FIG. 4

A gas generator 1C shown in FIG. 4 differs from the gas generator 1 shown in FIG. 1 in that a deformable member is used in place of the combination of the retainer 70 and the space 80, other features being the same.

A deformable member (a sponge) 90 is disposed in contact with the first surface 61a of the circular main body portion 61 and the annular wall surface 62 of the first closing member 60.

The sponge 90 is held from both sides in the axis X direction between the first closing member 60 and the gas generating agent 26.

The sponge 90 has a disk shape but may have an annular shape.

An operation performed when the gas generator 1C shown in FIG. 4 is placed in a high-temperature atmosphere caused by fire will be described hereinbelow.

When the gas generator 1C is placed in a high-temperature atmosphere caused by fire, the first closing member 60 receives a pressure and an impact similarly to the gas generator 1 shown in FIG. 1, and pushes the sponge 90 toward the igniter 25.

The sponge 90, which is pushed toward the igniter 25, shrinks and becomes smaller between the first closing member 60 and the gas generating agent 26. As a result, the first closing member 60 deforms and moves as shown, for example, in (b) in FIG. 1, thereby forming a gap between the inner circumferential wall surface 11c and the first closing member 60.

As the gap is formed, the combustion chamber 30 and the diffuser chamber 40 are communicated with each other.

Thereafter, since the gas generator operates in the same way as the gas generator 1 shown in FIG. 1, the combustion gas is discharged to the outside of the gas generator 1C, and no excessive pressure is applied to parts of the gas generator 1C including the housing 10. As a result, even when a strength of the parts of the gas generator 1C including the housing 10 is deteriorated by heat, these parts are not fractured and the debris thereof are not scattered.

Figure 5:
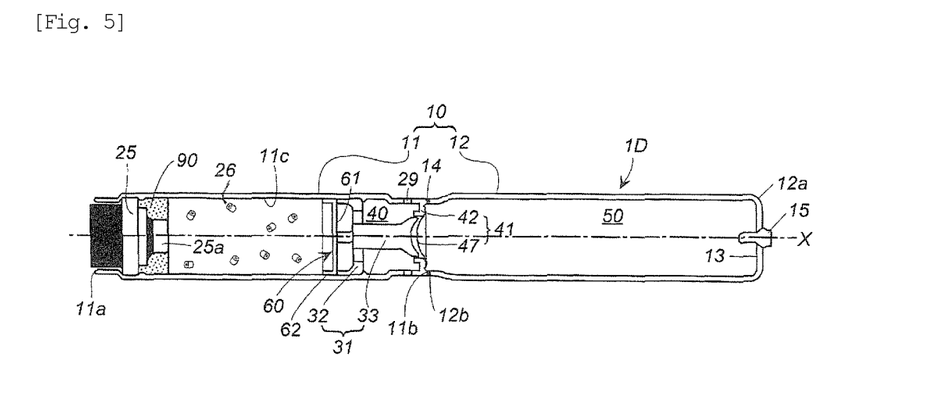
FIG. 5 shows a cross-sectional view in a longitudinal direction of a gas generator which is yet another embodiment of the present invention.

(5) Gas Generator Shown in FIG. 5

A gas generator 1D shown in FIG. 5 differs from the gas generator 1 shown in FIG. 1 in that a deformable member is used in place of the combination of the retainer 70 and the space 80, other features being the same.

A deformable member (a sponge) 90 has an annular shape and is disposed in contact with the gas generating agent 26 and also in contact with a portion excluding the upper surface of the ignition portion 25a of the igniter 25.

The sponge 90 is held from both sides in the axis X direction between the gas generating agent 26 and the igniter 25.

An operation performed when the gas generator 1D shown in FIG. 5 is placed in a high-temperature atmosphere caused by fire will be described hereinbelow.

When the gas generator 1D is placed in a high-temperature atmosphere caused by fire, the first closing member 60 receives a pressure and an impact similarly to the gas generator 1 shown in FIG. 1, and pushes the gas generating agent 26 filled in the combustion chamber 30 toward the igniter 25.

When the sponge 90 is pushed by the gas generating agent 26 which is pushed toward the igniter 25, the sponge 90 shrinks and becomes smaller between the igniter 25 and the gas generating agent 26. As a result, the first closing member 60 deforms and moves as shown, for example, in (b) in FIG. 1, thereby forming a gap between the inner circumferential wall surface 11c and the first closing member 60.

As the gap is formed, the combustion chamber 30 and the diffuser chamber 40 are communicated with each other.

Thereafter, since the gas generator operates in the same way as the gas generator 1 shown in FIG. 1, the combustion gas is discharged to the outside of the gas generator 1D, and no excessive pressure is applied to parts of the gas generator 1D including the housing 10. As a result, even when a strength of the parts of the gas generator 1D including the housing 10 is deteriorated by heat, these parts are not fractured and the debris thereof are not scattered.

Figure 6:
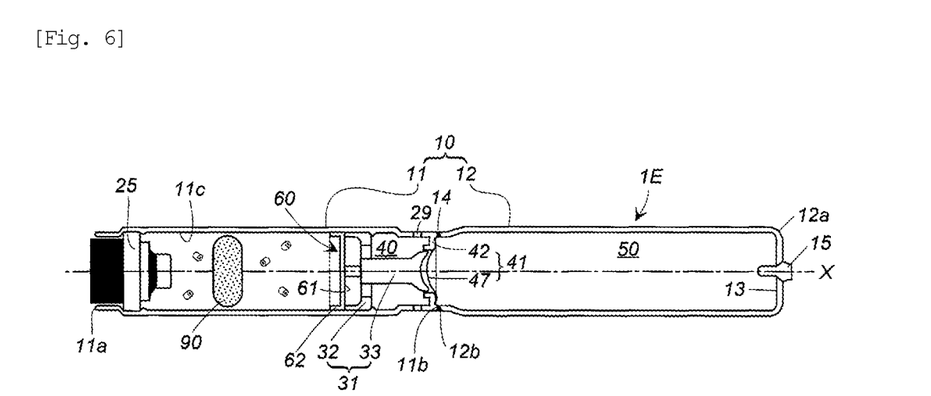
FIG. 6 shows a cross-sectional view in a longitudinal direction of a gas generator which is yet another embodiment of the present invention.

(6) Gas Generator Shown in FIG. 6

A gas generator 1E shown in FIG. 6 differs from the gas generator 1 shown in FIG. 1 in that a deformable member is used in place of the combination of the retainer 70 and the space 80, other features being the same.

A deformable member (a sponge) 90 is in the form of a plate and is disposed in a state of being surrounded by the gas generating agent 26 in the combustion chamber 30.

The sponge 90 is held from both sides in the axis X direction by the gas generating agent 26.

An operation performed when the gas generator 1E shown in FIG. 6 is placed in a high-temperature atmosphere caused by fire will be described hereinbelow.

When the gas generator 1E is placed in a high-temperature atmosphere caused by fire, the first closing member 60 receives a pressure and an impact similarly to the gas generator 1 shown in FIG. 1, and pushes the gas generating agent 26 filled in the combustion chamber 30 toward the igniter 25.

When the sponge 90 is pushed by the gas generating agent 26 which is pushed toward the igniter 25, the sponge 90 shrinks and becomes smaller between the gas generating agent 26. As a result, the first closing member 60 deforms and moves as shown, for example, in (b) in FIG. 1, thereby forming a gap between the inner circumferential wall surface 11c and the first closing member 60.

As the gap is formed, the combustion chamber 30 and the diffuser chamber 40 are communicated with each other.

Thereafter, since the gas generator operates in the same way as the gas generator 1 shown in FIG. 1, the combustion gas is discharged to the outside of the gas generator 1E, and no excessive pressure is applied to parts of the gas generator 1E including the housing 10. As a result, even when a strength of the parts of the gas generator 1E including the housing 10 is deteriorated by heat, these parts are not fractured and the debris thereof are not scattered.

Figure 7:
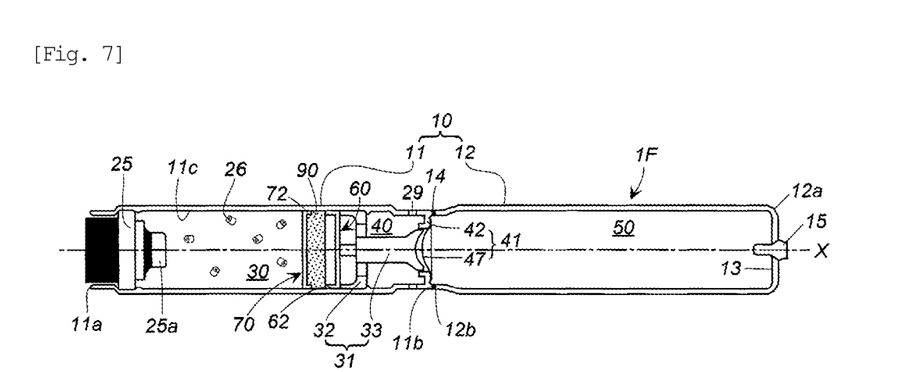
FIG. 7 shows a cross-sectional view in a longitudinal direction of a gas generator which is yet another embodiment of the present invention.

(7) Gas Generator Shown in FIG. 7

A gas generator 1F shown in FIG. 7 differs from the gas generator 1 shown in FIG. 1 in that a retainer 70 and a deformable member (a sponge) 90 are used in combination in place of the combination of the retainer 70 and the space 80, other features being the same.

The retainer 70 is the same as the retainer 70 shown in FIG. 1, but is disposed such that the annular portion 72 is on the side of the first closing member 60, and a gap is formed between the annular portion 72 and the annular wall surface 62 of the first closing member 60.

The sponge 90 is disposed between the first closing member 60 and the retainer 70. The sponge 90 abuts against the annular wall surface 62 of the first closing member 60.

An operation performed when the gas generator 1F shown in FIG. 7 is placed in a high-temperature atmosphere caused by fire will be described hereinbelow.

When the gas generator 1F is placed in a high-temperature atmosphere caused by fire, the first closing member 60 receives a pressure and an impact similarly to the gas generator 1 shown in FIG. 1, and pushes the sponge 90 toward the igniter 25.

When the sponge 90 is pushed toward the igniter 25, the sponge 90 shrinks and becomes smaller. As a result, the first closing member 60 deforms and moves as shown, for example, in (b) in FIG. 1, thereby forming a gap between the inner circumferential wall surface 11c and the first closing member 60.

As the gap is formed, the combustion chamber 30 and the diffuser chamber 40 are communicated with each other.

Thereafter, since the gas generator operates in the same way as the gas generator 1 shown in FIG. 1, the combustion gas is discharged to the outside of the gas generator 1F, and no excessive pressure is applied to parts of the gas generator 1F including the housing 10. As a result, even when a strength of the parts of the gas generator 1F including the housing 10 is deteriorated by heat, these parts are not fractured and the debris thereof are not scattered.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising;
   a combustion chamber, which is located on a side of a first end portion of a cylindrical housing and accommodates an igniter and a gas generating agent;
   a pressurized gas chamber, which is located on a side of a second end portion opposite to the first end portion and filled with a gas selected from a rare gas or a nitrogen gas;
   a diffuser chamber, which is located between the combustion chamber and the pressurized gas chamber and provided with a gas discharge port;
   a first closing member abutting against an inner circumferential wall surface of the cylindrical housing and closing between the combustion chamber and the diffuser chamber;
   a second closing member being fixed to the inner circumferential wall surface of the cylindrical housing and closing between the pressurized gas chamber and the diffuser chamber,
   the combustion chamber having at least one of a space in which the first closing member deforms or moves, and a member which forms the space for enabling the first closing member to deform or move,
   when the gas generator is placed in a high-temperature atmosphere caused by fire, due to expansion of the gas in the pressurized gas chamber, the second closing member being ruptured from the pressurized gas chamber toward the diffuser chamber to allow the gas to flow into the diffuser chamber, and
   then, due to a pressure increase or an impact caused by the gas inflow into the diffuser chamber, the first closing member being deformed or the first closing member being moved toward the combustion chamber, thereby making the combustion chamber and the diffuser chamber communicate with each other and making an inside of the combustion chamber and an outside of the gas generator communicate with each other.

2. The gas generator according to claim 1, wherein the space is formed in the combustion chamber to enable the first closing member to deform or move, and
   the space is formed between the gas generating agent and the first closing member by a retainer which is in contact with the gas generating agent, arranged at a distance from the first closing member and provided with a communication hole.

3. The gas generator according to claim 1, wherein the space is formed in the combustion chamber to enable the first closing member to deform or move,
   the space is formed between the gas generating agent and the igniter by a retainer which is in contact with the gas generating agent, arranged at a distance from the igniter and provided with a communication hole, and
   the retainer is moved toward the igniter when the first closing member is deformed by the pressure increase or the impact caused by gas inflow into the diffuser chamber.

4. The gas generator according to claim 1, wherein the space is formed in the combustion chamber to enable the first closing member to deform or move,
   the space is formed between a first retainer and a second retainer, the first retainer is disposed on a side of the first closing member and provided with a communication hole, and the second retainer is disposed on a side of the igniter, axially spaced from the first retainer and provided with a communication hole,
   a surface of the first retainer on the side of the first closing member and a surface of the second retainer on the side of the igniter are in contact with the gas generating agent, and
   the first retainer is moved toward the second retainer when the first closing member is deformed by the pressure increase or the impact caused by gas inflow into the diffuser chamber.

5. The gas generator according to claim 1, wherein the member is arranged to form the space in the combustion chamber which enables the first closing member to deform or move,
   the member is a deformable member disposed in contact with both the first closing member and the gas generating agent, and
   the space which enables the first closing member to deform or move is formed by deformation of the first closing member and deformation of the deformable member caused by the pressure increase or the impact caused by gas inflow into the diffuser chamber.

6. The gas generator according to claim 1, wherein the member for forming the space in the combustion chamber which enables the first closing member to deform or move is a deformable member disposed between the gas generating agent and the igniter,
   the deformable member is disposed in contact with the gas generating agent and the igniter in a portion excluding the ignition portion, and
   the space which enables the first closing member to deform or move is formed by deformation of the first closing member and deformation of the deformable member caused by the pressure increase or the impact caused by gas inflow into the diffuser chamber.

7. The gas generator according to claim 1, wherein the member is arranged to form the space in the combustion chamber which enables the first closing member to deform or move, the member is a deformable member disposed such that at least both end surfaces thereof is surrounded by the gas generating agent, and the space which enables the first closing member to deform or move is formed by deformation of the first closing member and deformation of the deformable member caused by the pressure increase or the impact caused by gas inflow into the diffuser chamber.

8. The gas generator according to claim 1, wherein both the space in which the first closing member deforms or moves, and the member which forms the space for enabling the first closing member to deform or move, are arranged in the combustion chamber, the space is formed between the gas generating agent and the first closing member by a retainer which is in contact with the gas generating agent, arranged at a distance from the first closing member and provided with a communication hole, and the member is a deformable member disposed in the space.

9. The gas generator according to claim 1, wherein the first closing member has a circular bottom portion and an annular wall surface extending in one direction from an outer periphery of the circular bottom portion, an outer bottom surface of the circular bottom portion is positioned on a side of the diffuser chamber and an inner bottom surface on a side of the annular wall surface is positioned on a side of the combustion chamber, and an outer surface of the annular wall surface and the inner circumferential wall surface of the cylindrical housing are abutted against each other with a sealant being interposed therebetween.

10. The gas generator according to claim 1, wherein the first closing member has a fragile portion for assisting the deformation or movement thereof.

* * * * *